April 6, 1926.
A. SKENE
1,579,406
QUACK GRASS DESTROYER
Filed Sept. 14, 1922   2 Sheets-Sheet 1
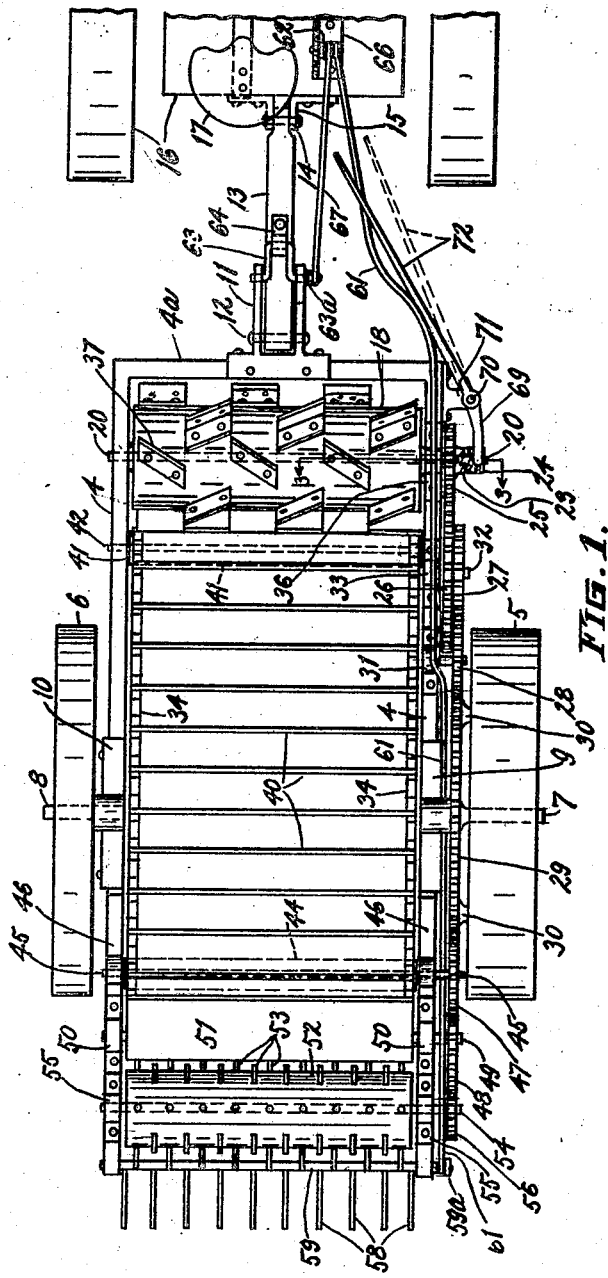
INVENTOR
Alexander Skene
BY A. M. Carlsen
ATTORNEY April 6, 1926. 1,579,406
A. SKENE
QUACK GRASS DESTROYER
Filed Sept. 14, 1922 2 Sheets-Sheet 2
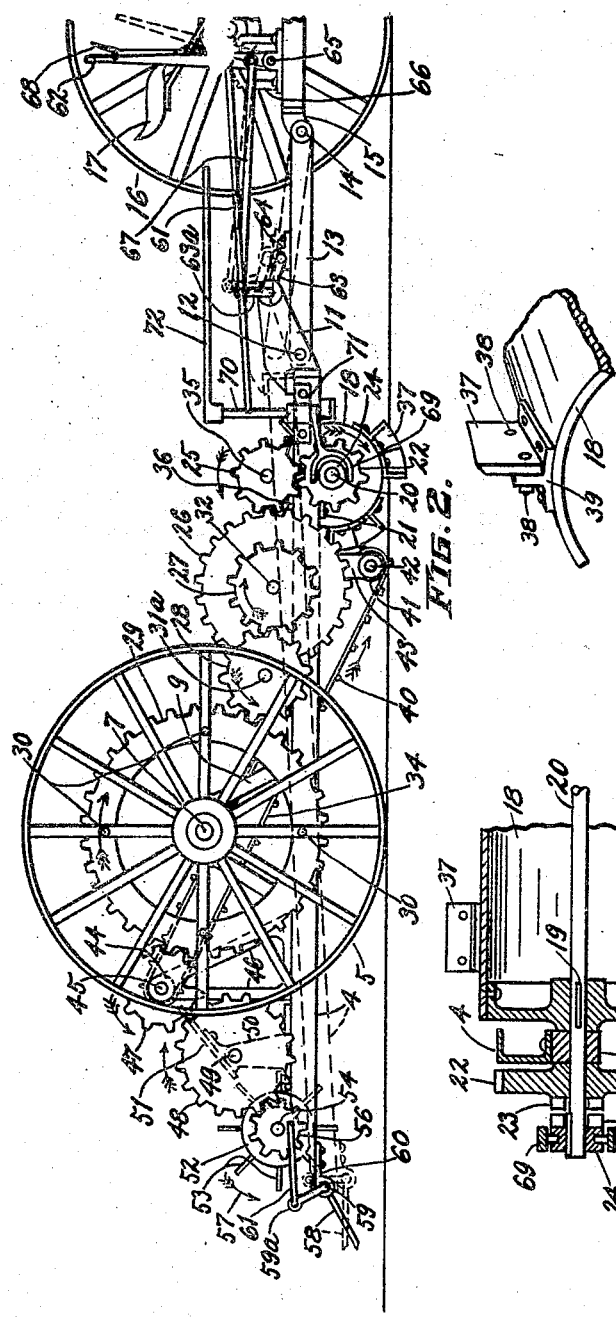
INVENTOR
Alexander Skene
BY A. M. Carlsen
ATTORNEY Patented Apr. 6, 1926.

1,579,406

UNITED STATES PATENT OFFICE.

ALEXANDER SKENE, OF HOOPLE, NORTH DAKOTA.

QUACK-GRASS DESTROYER.

Application filed September 14, 1922. Serial No. 588,128.

*To all whom it may concern:*

Be it known that I, ALEXANDER SKENE, a citizen of the United States, residing at Hoople, in the county of Walsh and State of North Dakota, have invented certain new and useful Improvements in Quack-Grass Destroyers, of which the following is a specification.

My invention relates to quack grass destroyers and the object is to provide an efficient and economically operated device by which quack grass is uprooted, separated from the soil and deposited on top of the ground from where it may be subsequently removed and destroyed.

In the accompanying drawing;

Fig. 1 is a top view of the preferred form of my device and the rear portion of a tractor to which it is attached.

Fig. 2 is a right hand side elevation of Fig. 1.

Fig. 3 is an enlarged sectional detail as on line 3—3 in Fig. 1.

Fig. 4 is a fragmentary perspective view showing how the blades are secured on the front roller.

Referring to the drawing by reference numerals, 4 designates the main frame of my device which is of elongated rectangular form and normally suspended above the ground in parallel relation thereto by a right hand bull wheel 5 and a left hand ground wheel 6 rotating on stub shafts 7 and 8, respectively, secured in right and left hand frame suspending castings 9 and 10.

To the front end $4^a$ of the frame 4 is secured a forwardly extending bifurcated casting 11. In the arms of said casting is a removable pin 12 pivotally engaging the rear end of a draw bar 13 extending forwardly and having its forward end pivotally secured as at 14 to the draw bar hitch member 15 on the rear end of a tractor 16 on which is the driver's seat 17.

In the front end of the frame 4 I mount a transversely arranged drum 18, keyed as at 19 on a shaft 20 (see Figs. 1 and 3). Said shaft is journaled in bearings 21 secured on the under side of the frame 4 and its right hand end is extended beyond the frame and carries a loosely mounted gear 22. Said gear has an outwardly disposed hub with clutch jaws 23 adapted to be engaged by jaw members $24^a$ of a slidably keyed clutch member 24 on the outer end of the shaft 20 for a purpose to be described.

The gear 22 is rotated through a train of gears 25, 26, 27, and 28, of which the latter meshes with a bull gear 29 suitably secured as at 30 to the inner side of the drive wheel 5. The gear 28 is rotatably mounted on a stub shaft $31^a$ of a bearing 31 secured on the frame. Opposite the bull gear said gear 28 meshes with gear 27 which is secured to a larger gear 26, both rotating on a stub shaft 32 secured in a casting 33 on the main frame. The forward teeth of gear 26 mesh with a small gear 25 loosely mounted on a stub shaft 35 in a casting 36 on the top of the frame and spaced above the previously mentioned gear 22 on the drum shaft 20 so that it meshes with said gear (see Fig. 2).

The object of increasing the speed of the last gear (22) in the train to a higher speed than that of the first gear (28) is to rotate the drum 18 at a certain predetermined speed with relation to the slowly revolving bull gear 29.

On the face of the drum 18 I secure a number of staggered, radially extending and diagonally arranged hoeing blades 37 each of which is detachably bolted as at 38 in Fig. 4 to a bracket 39 permanently secured on the drum. These blades 37 are placed obliquely with relation to the drum shaft (see Fig. 1) in such a manner that when the drum is rotated close to the ground the sharp edge of the blades hoe the surface of the ground into fragments and, by moving fast, throw the earth, together with the quack grass in it, upward and rearwardly onto the lower end of a rearwardly and upwardly inclined carrier apron preferably made of two link belts 34 and spaced bars 40 held at their ends in said link belts. Said lower end of the endless carrier is guided on a roller 41 on a shaft 42 rotating in a bearing casting 43 (see Fig. 2) secured on the frame 4. The upper end of the carrier is driven by a roller 44 keyed on a shaft 45 rotatable in bearings 46 on the frame rearward of the bull wheel and said bearings being located at a suitable height above the frame 4. The right hand end of said shaft 45 extends beyond the bearing and has a gear 47 keyed to it and meshing with the bull gear 29. It also meshes with another gear 48 rotatable on a stub shaft 49 in the right hand upright frame casting 50. A rearwardly and downwardly slanting board 51 is secured to and between the castings 50 in such a manner that it catches all the dirt and quack grass dropping from the upper run of the endless carrier 39, the slope of the board causing all of said dirt and quack grass to slide down to a threshing roller 52 transversely arranged in the frame and having radial pegs 53. This roller is keyed on a shaft 54 rotatably mounted in frame brackets 55 and the right hand end of said shaft is extended beyond the bracket 55 and has secured to it a gear 56 meshing with gear 48 which rotates the roller in the direction of arrow 57. This threshing roller serves to further break up the dirt, separating it from the quack grass, the dirt falling down from the rear side of the roller but the quack grass being thrown on a rearwardly extending fork or grate comprising lateral spaced tines 58 the forward ends of which are secured in a transverse rocker shaft 59 journaled in castings 60 on the under side of the main frame.

When my machine is in the operative position illustrated in Fig. 2 the above tines slope downwardly and rearwardly (as shown) thus depositing the quack grass and roots on top of the ground, while any dirt which remains in the grass when hitting the grate drops down between the tines and thus gets under the grass. The shaft 59 may have an upwardly disposed rocker arm 59ª at its right hand end. At the upper end of said arm is pivotally secured the rear end of a rod 61 the front end of which is pivotally secured to a frame tilting lever 62 mounted on the tractor platform and which will now be described.

The draw bar casting 11, previously mentioned, has its bifurcated portion extended forwardly and upwardly and a crank shaft 63 journaled therein, said crank shaft having an upwardly extending lever arm 63ª, and the crank portion normally extended forward and journaled in a slot (not shown) in a bearing 64 secured on the top of the draw bar 13. The tilting lever 62 is vertically disposed near the driver's seat and is pivoted as at 65 in a segmental toothed bracket 66 secured on the tractor platform. A link 67 connects this lever 62 to the lever arm 63ª of the crank 63. 68 is a finger latch to engage or disengage the hand lever 62 and the toothed segment 66.

When the hand lever 62 is pushed forward as to the dotted position 62, link 67 pulls on crank lever 63ª which causes the front part of the crank to act as a fulcrum in the bracket 64 and the crank shaft to raise the bracket 11 and thereby the front end of the main frame 4, whereby the cutting or digging roller 18 is disengaged from the ground. By moving the tilting lever 62 rearwardly the opposite result is secured, namely to drop the digging or plowing member as deeply into the ground as desired.

When the front end of the main frame is raised, as described, the rear end will swing down and the grate 58—59 would normally drag on the ground. To prevent this I have provided the previously mentioned arm 59ª and rod 61, the latter being connected to the tilting lever 62. Thus when the tilting lever is pushed forward, rod 61 pulls on the lever arm 59ª and the tines 58 are raised to about the horizontal position shown dotted in Fig. 2.

69 is a clutch shifter fork engaging the clutch member 24. It is secured on the lower end of a vertically arranged shaft 70 journaled as at 71 on the main frame and forward of the clutch member. A forwardly extending lever 72 is fixed on the upper end of shaft 70 and arranged to be within reach of the driver who can engage the clutch members on the drum shaft 20 by merely pushing lever 72 to the right (see dotted lines in Fig. 1).

It is readily understood that the trains of gears, as shown, are always in mesh but the forward gear 25 is loose on shaft 20 and leaves the plowing members or drum 18 idle until the clutch 24 (which is slidably keyed on said shaft 20) is engaged with said gear. Similar clutch members (not shown) may be used to make other parts inoperative when the machine is drawn idle over the ground or on roads, but as such means may be used without departing from the scope and spirit of my invention I have not illustrated them.

What I claim is:

1. In a quack grass destroyer, an elongated wheel-supported tiltable frame, a digging roller in the front end of the frame and a disintegrating roller in the rear end thereof, an endless combined elevator and conveyor arranged to carry the dug soil to the rear roller, an inclined board guiding the conveyed soil from the conveyor onto the disintegrating roller, and a normally inclined tiltable grate in the path of the soil leaving the disintegrating roller, and means operable from the front end of the frame for tilting said grate.

2. In a quack grass destroyer, an elongated wheel-supported tiltable frame, a digging roller in the front end of the frame and a disintegrating roller in the rear end thereof, an endless combined elevator and conveyor arranged to carry the dug soil to the rear roller, an inclined board guiding the conveyed soil from the conveyor onto the disintegrating roller, and a tiltable grate arranged in the path of the dirt leaving the disintegrating roller, and means operable from the front end of the machine for tilting the main frame and the said tiltable grate.

In testimony whereof I affix my signature.

ALEXANDER SKENE.